(12) United States Patent
Heller et al.

(10) Patent No.: US 8,380,907 B2
(45) Date of Patent: Feb. 19, 2013

(54) METHOD, SYSTEM AND COMPUTER PROGRAM PRODUCT FOR PROVIDING FILTERING OF GUEST2 QUIESCE REQUESTS

(75) Inventors: Lisa C. Heller, Rhinebeck, NY (US); Damian L. Osisek, Vestal, NY (US); Charles F. Webb, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 12/037,887

(22) Filed: Feb. 26, 2008

(65) Prior Publication Data

US 2009/0217264 A1    Aug. 27, 2009

(51) Int. Cl.
*G06F 13/24* (2006.01)
(52) U.S. Cl. ......... 710/260; 710/262
(58) Field of Classification Search .......... 710/260, 710/262
See application file for complete search history.

(56) References Cited

U.S. PATENT DOCUMENTS

| | | | | |
|---|---|---|---|---|
| 4,792,895 | A * | 12/1988 | Tallman | 718/1 |
| 4,843,541 | A | 6/1989 | Bean et al. | |
| 5,222,215 | A | 6/1993 | Chou et al. | |
| 5,317,705 | A * | 5/1994 | Gannon et al. | 718/100 |
| 5,381,535 | A * | 1/1995 | Gum et al. | 718/105 |
| 5,428,757 | A | 6/1995 | Sutton | |
| 5,530,820 | A * | 6/1996 | Onodera | 718/1 |
| 5,555,414 | A * | 9/1996 | Hough et al. | 710/261 |
| 5,574,878 | A * | 11/1996 | Onodera et al. | 711/207 |
| 5,584,042 | A | 12/1996 | Cormier et al. | |
| 5,652,853 | A | 7/1997 | Duvalsaint et al. | |
| 6,119,219 | A | 9/2000 | Webb et al. | |
| 6,378,027 | B1 | 4/2002 | Bealkowski et al. | |
| 6,453,392 | B1 | 9/2002 | Flynn, Jr. | |
| 6,493,741 | B1 | 12/2002 | Emer et al. | |
| 6,493,816 | B1 | 12/2002 | Munroe et al. | |
| 6,604,185 | B1 | 8/2003 | Fromm | |
| 6,671,795 | B1 | 12/2003 | Marr et al. | |
| 6,728,746 | B1 | 4/2004 | Murase et al. | |
| 6,959,352 | B1 | 10/2005 | Dickey | |
| 7,107,411 | B2 | 9/2006 | Burton et al. | |

(Continued)

OTHER PUBLICATIONS

"IBM® z/Architecture Principles of Operation", Publication No. SA22-7832-05, 6th Edition, Apr. 2007. 1,215 pages separated into 4 electronic attachments.

(Continued)

*Primary Examiner* — Glenn A Auve
*Assistant Examiner* — Nimesh G Patel
(74) *Attorney, Agent, or Firm* — Cantor Colburn LLP; John Campbell

(57) ABSTRACT

A method, system and computer program product for providing filtering of level two guest (G2) quiesce requests. The method includes receiving a G2 quiesce interruption request at a processor currently or previously executing a G2 running under a level two hypervisor in a logical partition. The G2 includes a current zone and G2 virtual machine (VM) identifier. The quiesce interruption request specifies an initiating zone and an initiating G2 VM identifier. It is determined if the G2 quiesce interruption request can be filtered by the processor. The determining is responsive to the current G2 VM identifier, the current zone, the initiating zone and the initiating G2 VM identifier. The G2 quiesce interruption request is filtered at the processor in response to determining that the G2 quiesce interruption request can be filtered. Thus, filtering between G2 virtual machines running in the logical partition is provided.

14 Claims, 9 Drawing Sheets

U.S. PATENT DOCUMENTS

| | | |
|---|---|---|
| 7,167,956 B1 | 1/2007 | Wright et al. |
| 7,234,037 B2 | 6/2007 | Errickson et al. |
| 7,321,369 B2 | 1/2008 | Wyatt et al. |
| 2002/0052914 A1 | 5/2002 | Zalewski et al. |
| 2002/0083258 A1 | 6/2002 | Bauman et al. |
| 2003/0009648 A1 | 1/2003 | Doing et al. |
| 2003/0037089 A1* | 2/2003 | Cota-Robles et al. ............ 709/1 |
| 2003/0037178 A1 | 2/2003 | Vessey et al. |
| 2004/0143712 A1 | 7/2004 | Armstrong et al. |
| 2004/0230976 A1* | 11/2004 | Slegel et al. .................. 718/100 |
| 2005/0102670 A1 | 5/2005 | Bretl et al. |
| 2005/0114855 A1 | 5/2005 | Baumberger |
| 2005/0223005 A1 | 10/2005 | Shultz et al. |
| 2006/0036824 A1 | 2/2006 | Greiner et al. |
| 2006/0259710 A1 | 11/2006 | Gimpl et al. |
| 2006/0259818 A1* | 11/2006 | Howell et al. ................... 714/21 |
| 2007/0050764 A1* | 3/2007 | Traut ................................ 718/1 |
| 2007/0067775 A1 | 3/2007 | Shultz et al. |
| 2007/0089111 A1* | 4/2007 | Robinson et al. ................. 718/1 |
| 2007/0113217 A1 | 5/2007 | Gish et al. |
| 2007/0157198 A1* | 7/2007 | Bennett et al. .................... 718/1 |
| 2008/0046885 A1 | 2/2008 | Shultz et al. |
| 2008/0086729 A1 | 4/2008 | Kondoh et al. |
| 2009/0216929 A1 | 8/2009 | Heller |
| 2009/0216963 A1 | 8/2009 | Greiner |
| 2009/0216995 A1 | 8/2009 | Heller |
| 2009/0217269 A1 | 8/2009 | Heller et al. |

OTHER PUBLICATIONS

U.S. Appl. No. 12/037,808 Final Office Action dated Sep. 28, 2010.

U.S. Appl. No. 12/037,808 Non Final Office Action dated Apr. 27, 2010.

U.S. Appl. No. 12/037,897 Non Final Office Action dated Sep. 23, 2010.

U.S. Appl. No. 12/037,808 Non Final Office Action dated Feb. 17, 2011.

U.S. Appl. No. 12/037,897 Final Office Action dated Jan. 31, 2011.

U.S. Appl. No. 12/037,177; Non Final Office Action dated Apr. 26, 2011.

U.S. Appl. No. 12/037,808 Notice of Allowance dated Nov. 16, 2011.

U.S. Appl. No. 12/037,177; Final Office Action dated Sep. 14, 2011.

U.S. Appl. No. 12/037,177 Non Final Office Action dated Feb. 9, 2012.

U.S. Appl. No. 12/037,177; Final Office Action dated Jul. 12, 2012, 18 pages.

U.S. Appl. No. 13/372,603 Notice of Allowance dated Jul. 31, 2012, 14 pages.

U.S. Appl. No. 12/037,887 Non Final Office Action dated Sep. 24, 2012, 25 pages.

* cited by examiner

METHOD, SYSTEM AND COMPUTER PROGRAM PRODUCT FOR PROVIDING FILTERING OF GUEST2 QUIESCE REQUESTS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

This invention relates to processing within a computing environment, and more particularly, to filtering of quiesce requests initiated by a second-level guest by one or more processors in the computing environment.

The processing of a request by one processor of a computing environment may affect one or more other processors of the environment. For example, in a Symmetric Multiprocessing System (SMP) based on the IBM z/Architecture, there are certain types of quiesce requests or broadcast purge operations such as Set Storage Key (SSKE), Invalidate Page Table Entry (IPTE), Invalidate DAT Table Entry (IDTE) and Compare and Swap and Purge (CSP and CSPG) which require all the processors in the system to quiesce in order to observe the system update(s) consistently. Other computer architectures also provide a similar mechanism.

One common implementation for the quiesce purge operation includes the following: 1) all the processors are quiesced (i.e., most normal processing operations are suspended, including accessing the TLB and ALB); 2) any buffered entries in the Translation Look-aside Buffers (TLBs) and/or in the Access-Register-Translation Look-aside Buffer (ALB) which are dependent on the resources being updated are invalidated; 3) the common resource (translation table entry in storage for IPTE, IDTE, CSP or CSPG or a storage key for SSKE) is updated, and 4) finally, the quiesce is released and the processors continue their normal activity. Obviously, this implementation could have a major performance impact, especially for large SMP configurations, since all processors must be quiesced for the duration of the operation. In particular, it is common that one processor is executing a long running instruction that is not interruptible, so that the one processor can not reach the quiesced state for some time. Thus, all other processors are required to wait for this last processor to reach the quiesced state before the steps described above can be completed.

Some strides have been made in the above processing to enhance performance by attempting to quiesce the processors for a shorter period of time. For example, in some implementations when a processor receives a request, it immediately quiesces and then purges the appropriate entries in its own TLB and/or ALB. After the purge is complete, this processor is allowed to continue processing subject to various restrictions. One of these restrictions includes that the processor is not permitted to perform address translation or fetch a storage key but instead must stall until the quiesce is released. Only after the quiesce is released, indicating that the system resources have been updated, are all restrictions removed from the processors.

Further strides to enhance performance are directed to reducing the restriction applied to address translation and key accesses during the quiesce window. For example, after purging its own TLB and/or ALB the purging processor is only restricted, using the page index (PX), segment index (SX) and/or absolute address of the translation, to perform an address translation or key access which potentially uses the system resources being updated by the quiesce operation.

Other performance enhancements have been directed to reducing the number of processors which need to honor the quiesce request. Since 1) the interruption of processors to honor the quiesce request is needed to prevent inconsistent values for translation tables or storage keys from being observed in the middle of an instruction or function and 2) when the active zone on the receiving processor is different from the zone which initiated the quiesce operation, the storage accesses being made by the receiving processor do not use the system resources that are being updated by the initiating zone, there is no need for processors running in a zone different than the quiesce-initiator's zone to be interrupted. This decreases the number of processors that need to be interrupted for a particular quiesce request and, in turn, also decreases the overall time needed to handle the quiesce request since the initiator needs to wait for fewer processors to respond to the interruption request.

Thus, although attempts have been made to reduce the amount of time processors are quiesced for system resource updates, enhancements are still needed. For example, although fewer processors are required to honor the quiesce interruption from a logical partition (LPAR) perspective this same capability does not exist for handling the requests for a virtual machine running in a partition.

BRIEF SUMMARY OF THE INVENTION

An exemplary embodiment of the present invention includes a method for filtering level 2 guest (G2) quiesce interruption requests. The method includes receiving a quiesce interruption request at a processor currently or previously executing a G2 running under a level two hypervisor in a logical partition. The G2 includes a current zone and G2 virtual machine (VM) identifier. The G2 quiesce interruption request specifies an initiating zone and an initiating G2 VM identifier. It is determined if the G2 quiesce interruption request can be filtered by the processor. The determining is responsive to the current G2 VM identifier, a current zone, the initiating zone and the initiating G2 VM identifier. The G2 quiesce interruption request is filtered at the processor in response to determining that the G2 quiesce interruption request can be filtered. Thus, filtering between G2 virtual machines running in the logical partition is provided.

Another exemplary embodiment includes a system for filtering G2 quiesce interruption requests. The system includes a processor for receiving a G2 quiesce interruption request. The processor is currently or was previously executing a G2 running under a level two hypervisor in a logical partition. The G2 includes a current zone and G2 VM identifier. The processor includes instructions for implementing a method that includes receiving a G2 quiesce interruption request at the processor. The quiesce interruption request specifies an initiating zone and an initiating G2 VM identifier. It is determined if the G2 quiesce interruption request can be filtered by the processor. The determining is responsive to the current G2 VM identifier, the current zone, the initiating zone and the initiating G2 VM identifier. The G2 quiesce interruption request is filtered at the processor in response to determining that the G2 quiesce interruption request can be filtered. Thus, filtering between G2 virtual machines running in the logical partition is provided.

A further exemplary embodiment includes a computer program product for filtering G2 quiesce interruption requests.

The computer program product includes a tangible storage medium readable by a processing circuit and storing instructions for execution by the processing circuit for performing a method. The method includes receiving a G2 quiesce interruption request at a processor currently or previously executing a level two guest (G2) running under a level two hypervisor in a logical partition. The G2 includes a current zone and G2 virtual machine (VM) identifier. The G2 quiesce interruption request specifies an initiating zone and an initiating G2 VM identifier. It is determined if the quiesce interruption request can be filtered by the processor. The determining is responsive to the current G2 VM identifier, the current zone, the initiating zone and the initiating G2 VM identifier. The G2 quiesce interruption request is filtered at the processor in response to determining that the quiesce interruption request can be filtered. Thus, filtering between G2 virtual machines running in the logical partition is provided.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Referring now to the drawings wherein like elements are numbered alike in the several FIGURES.

The detailed description explains the preferred embodiments of the invention, together with advantages and features, by way of example with reference to the drawings.

DETAILED DESCRIPTION OF EXEMPLARY EMBODIMENTS

This invention provides a mechanism to filter quiesce requests initiated by virtual machine that is executing as a second-level guest.

In accordance with an aspect of the present invention, a filtering capability is provided which allows broadcast quiesce interruptions which are issued by a processor operating at the guest2 level to be honored only by those processors which have or are running in the same guest2 multi-processor configuration.

Figure 1:
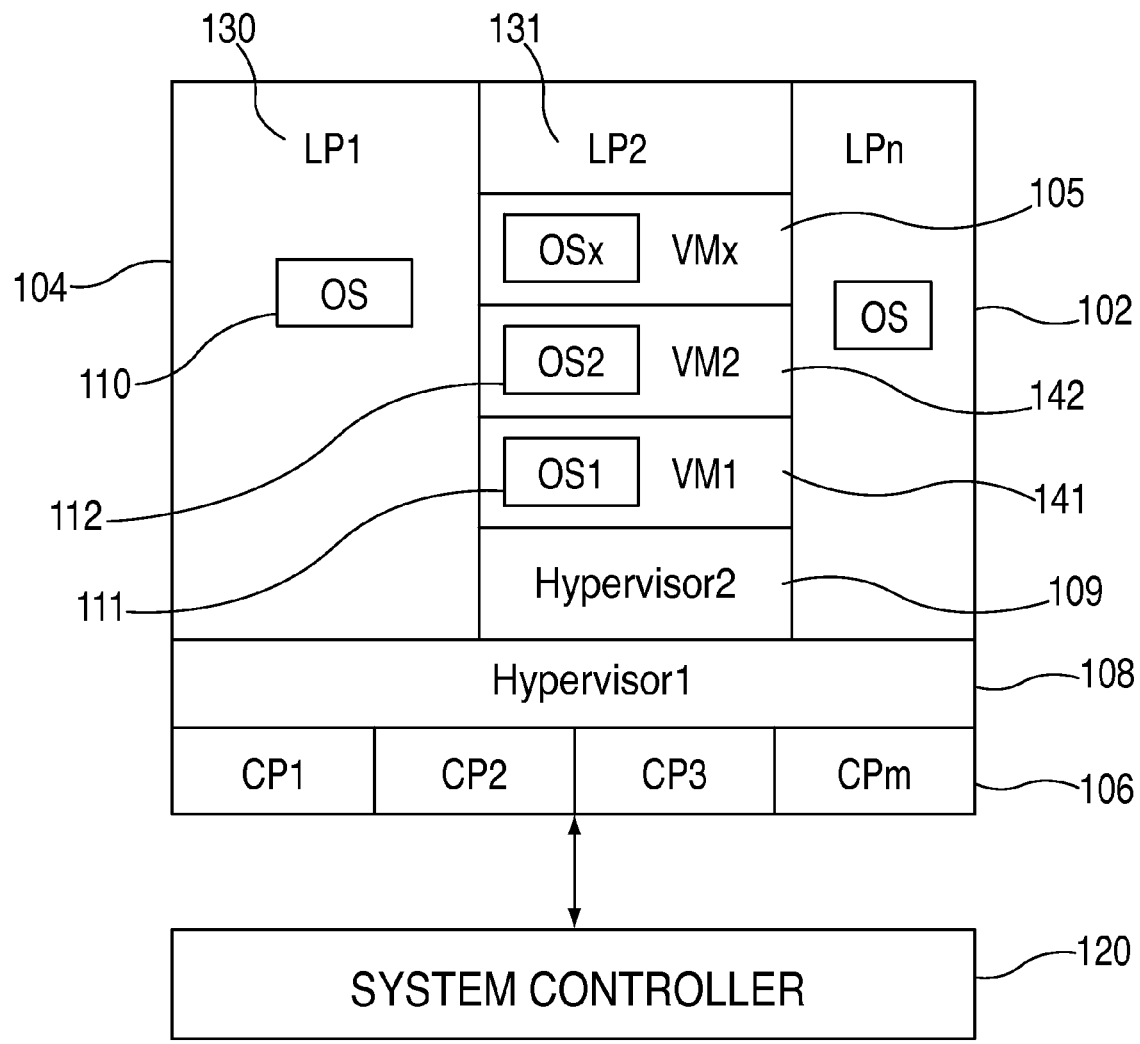
FIG. 1 depicts one embodiment of a computing environment that may be implemented by an exemplary embodiment of the present invention.

One embodiment of a computing environment 100 incorporating and using one or more aspects of the present invention is described with reference to FIG. 1. Computing environment 100 is based, for instance, on the z/Architecture offered by International Business Machines Corporation, Armonk, N.Y. The z/Architecture is described in an IBM® publication entitled, "z/Architecture Principles of Operation," IBM Publication No. SA22-7832-00, December 2000, which is hereby incorporated herein by reference in its entirety. In one example, a computing environment based on the z/Architecture includes an eServer zSeries, offered by International Business Machines Corporation, Armonk, N.Y.

As one example, computing environment 100 includes a central processor complex (CPC) 102 coupled to a system controller 120. Central processor complex 102 includes, for instance, one or more partitions 104 (e.g., logical partitions LP1-LPn), one or more central processors 106 (e.g., CP1-CPm), and a first-level hypervisor 108 (e.g., a logical partition manager), each of which is described below.

Each logical partition 104 is capable of functioning as a separate system. That is, each logical partition can be independently reset, initially loaded with an operating system, if desired, and operate with different programs. An operating system, hypervisor or application program running in a logical partition appears to have access to a full and complete system, but in reality, only a portion of it is available. A combination of hardware and Licensed Internal Code (commonly referred to as firmware, microcode or millicode) keeps a program in a logical partition from interfering with a program in a different logical partition. This allows several different logical partitions to operate on a single or multiple physical processors in a time sliced manner. A second-level hypervisor can run in a partition 104 and provide the same function, such as transparent time-slicing of resources between multiple operating systems (e.g. OS1-OSx running in virtual machines VM1-VMx 105) and isolation of operating systems from one another, within that logical partition.

In this particular example, logical partition 1 (LP1) 130 has a resident operating system 110 and logical partition 2 (LP2) 131 runs a second-level hypervisor2 109 which in turns creates virtual machines 141 and 142 each of which runs its own resident operating systems 111 and 112. Any number of the logical partitions may run a second-level hypervisor. In one embodiment, hypervisor2 109 is the z/VM hypervisor, offered by International Business Machines Corporation, Armonk, N.Y. In addition, the resident operating systems running in the various logical partitions may differ and, when running under a second-level hypervisor, the resident operating systems within a single partition may also differ. In one embodiment, operating system 110 is the z/OS operating system, which is offered by International Business Machines Corporation, Armonk, N.Y. In another embodiment, operating systems 111 and 112 are Linux.

Central processors 106 are physical processor resources that are allocated to the logical partitions. For instance, a logical partition 1 (LP1) 130 includes one or more logical processors, each of which represents all or a share of physical processor resources 106 allocated to the partition. The logical processors of a particular partition 104 may be either dedicated to the partition, so that the underlying processor resource is reserved for that partition; or shared with another partition, so that the underlying processor resource is potentially available to another partition. When a second-level hypervisor2 109 is running in logical partition 2 (LP2) 131, it can provide the same virtualization of resources provided by hypervisor1 to logical partitions 104 to the operating systems 111 and 112 running in virtual machines 141, 142 within that partition. As at the first level, each virtual machine may include multiple virtual processors. The term "virtual CPU" is used herein to refer generically to a logical or virtual processor.

Logical partitions 104 are managed by hypervisor 108 and 109 implemented by microcode running on processors 106. Logical partitions 104 and hypervisor 108 each comprise one or more programs residing in respective portions of central storage associated with the central processors. One example of hypervisor 108 is the Processor Resource/Systems Manager (PR/SM), offered by International Business Machines Corporation, Armonk, N.Y.

System controller 120, which is coupled to the central processor complex, includes centralized logic responsible for arbitrating between different processors issuing requests. For instance, when system controller 120 receives a quiesce request, it determines that the requester is the initiating processor for that request and that the other processors are receiving processors; it broadcasts messages; and otherwise, handles requests. Further details are described with reference to FIG. 2.

Figure 2:
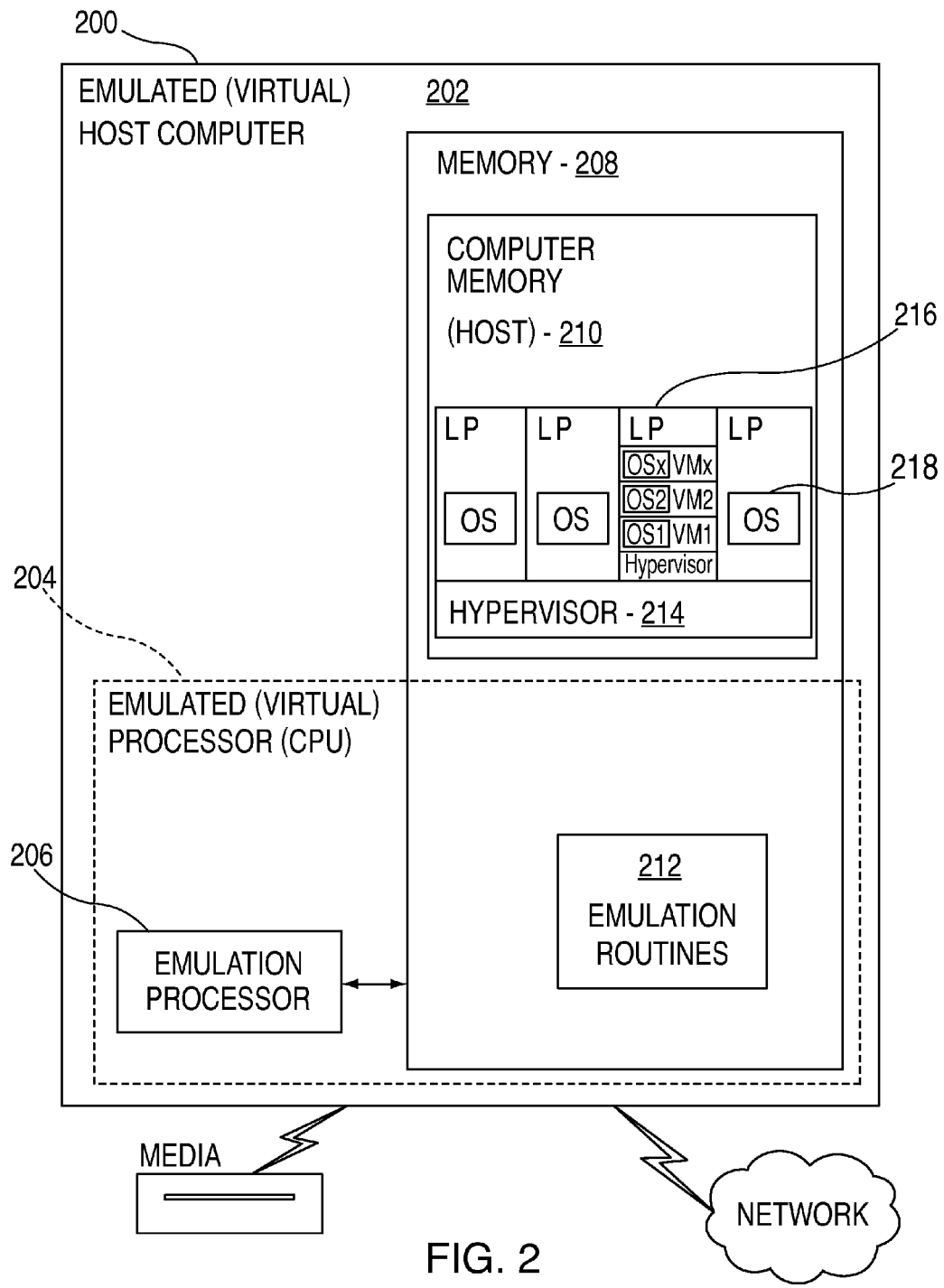
FIG. 2 depicts one embodiment of an emulated computing environment that may be implemented by an exemplary embodiment of the present invention.

Another example of a computing environment to incorporate one or more aspects of the present invention is depicted in FIG. 2. In this example, an emulated host computer system 200 is provided that emulates a host computer system 202 of a host architecture. In emulated host computer system 200, a host processor (CPU) 204 is an emulated host processor (or virtual host processor) and includes an emulation processor 206 having a different native instruction set architecture than used by the processors of host computer 202. Emulated host computer system 200 has memory 208 accessible to emulation processor 206. In the example embodiment, memory 208 is partitioned into a host computer memory 210 portion and an emulation routines 212 portion. Host computer memory 210 is available to programs of emulated host computer 200 according to host computer architecture, and may include both a host or hypervisor 214 and one or more hypervisors 214 running logical partitions (LPs) 216 running operating systems 218, analogous to the like-named elements in FIG. 1. Emulation processor 206 executes native instructions of an architected instruction set of an architecture other than that of the emulated processor 204, the native instructions obtained from emulation routines memory 212, and may access a host instruction for execution from a program in host computer memory 210 by employing one or more instruction(s) obtained in a sequence & access/decode routine which may decode the host instruction(s) accessed to determine a native instruction execution routine for emulating the function of the host instruction accessed. One such host instruction may be, for example, a Start Interpretive Execution (SIE) instruction, by which the host seeks to execute a program in a virtual machine. The emulation routines 212 may include support for this instruction, and for executing a sequence of guest instructions in accordance with the definition of this SIE instruction.

Other facilities that are defined for host computer system 202 architecture may be emulated by architected facilities routines, including such facilities as general purpose registers, control registers, dynamic address translation, and I/O subsystem support and processor cache for example. The emulation routines may also take advantage of functions available in emulation processor 204 (such as general registers and dynamic translation of virtual addresses) to improve performance of the emulation routines. Special hardware and offload engines may also be provided to assist processor 206 in emulating the function of host computer 202.

Figure 3:
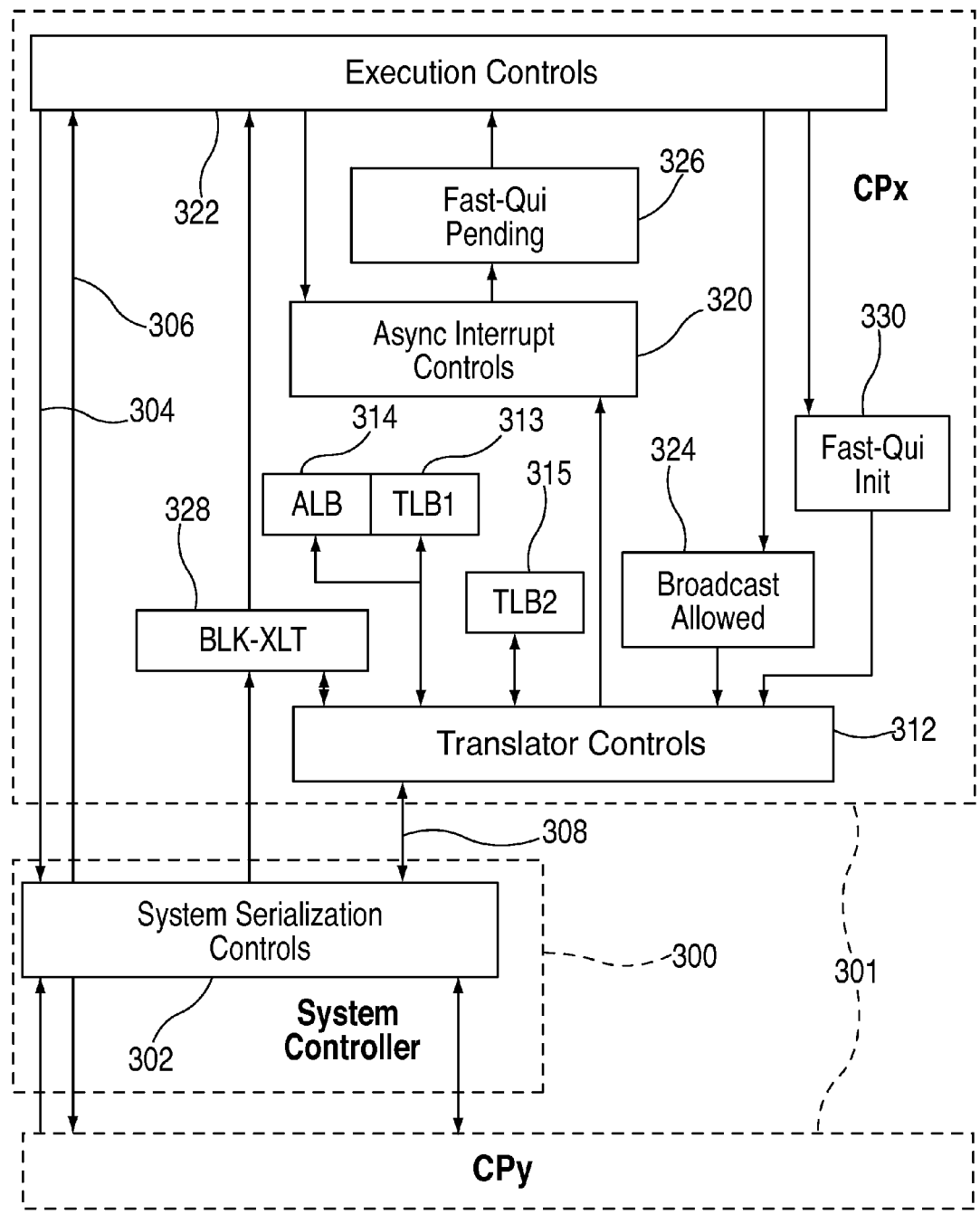
FIG. 3 depicts one embodiment of further details associated with a controller of FIG. 1, in accordance with an aspect of the present invention.

FIG. 3 depicts one example of a system controller 300 coupled to a plurality of central processors (CPUs) 301. In this example, two central processors are depicted. However, it will be understood that more than two processors may be coupled to system controller 300.

System Controller 300 includes various controls including, for instance, system serialization controls 302. The system serialization controls 302 are used to insure that operations that are to be serialized, such as Invalidate Page Table Entry (IPTE), Invalidate DAT Table Entry (IDTE), Set Storage Key Extended (SSKE), or Compare and Swap and Purge (CSP and CSPG) instructions, are serialized, such that only one such instruction is in progress at one time in the computing environment. It also monitors the sequence of events for that operation.

System controller 300 is coupled to each central processor 301 via various interfaces. For instance, an interface 304 to the controller 300 is used by the Licensed Internal Code in a central processor to send "control" commands, which specify an action to be taken, and to send "sense" commands, which return information from the controller 300. Another interface is a response bus 306, which is used to return information from the controller 300 for the "sense" commands. The response bus 306 is also used to communicate command status for "control" commands, and may be set from a plurality of sources within the controller 300, including the system serialization controls 302. A central processor 301 can use this interface to sense the state of the system serialization controls 302 in system controller 300.

A further interface is interface 308, which provides commands to translator controls 312 of central processor 301. Translator controls 312 process commands, in response to the signals. In one example, translator controls 312 process commands that affect one or more buffers, such as Translation Look-aside Buffers (TLBs) 313 and 315 and Access-Register-Translation Look-aside Buffers (ALBs) 314, described in further detail below.

In addition to translator controls 312, central processor 301 includes various other controls, including, for instance, asynchronous interruption controls 320 and execution controls 322. When the translator controls 312 receive a quiesce purge request from the controller 302, it determines if the request requires an interruption to this processor 301 and if it does, it sends a signal to the asynchronous interruption controls 320. In response to this, asynchronous interrupt controls 320 cause an internal fast-quiesce interruption 326 to be pending in the receiving processor, which in turn, causes execution controls 322 to suspend program instruction processing, at the next interruptible point. In response to the interruption, execution controls 322 invokes a millicode routine to set a broadcast operation allowed latch 324 to enable translator controls 312 to process the pending request. This causes the block-translation (BLK-XLT) latch 328 to be set on all processors 301 besides the fast-quiesce initiator, indicated by latch 330, until the system controller 300 receives the reset fast-quiesce command from the quiesce initiator. The block-translation latch 328 indicates to the translator controls 312 that certain translations (which may be associated with the pending system update) should be held until this latch 328 has dropped.

The above described computing environment is only one example. Many variations are possible without departing from the spirit of the present invention. For example, one or more partitions can be running in different architecture modes. Further, as another example, the environment need not be based on the z/Architecture, but instead, can be based on other architectures offered by Intel, Sun Microsystems, as well as others.

The hypervisor dispatches a guest (or virtual CPU within a zone or virtual machine) by issuing the Start Interpretive Execution (SIE) instruction. The operand of SIE is a control block, called the state description (SD), which defines the state of that particular guest. Therefore, when running only one level of hypervisor (guest1), the state description address can be used as a unique identifier for each virtual CPU within the system. When a second-level hypervisor such as z/VM dispatches a guest (or virtual CPU within a virtual machine), the state description address can be used as a unique identifier for each virtual CPU across all the virtual machines within any particular zone.

When the processor is executing instructions for a program running in a zone or partition, it is said to be running in a guest and the zone that is currently executing is called the "active" zone. When the processor is executing instructions on behalf of the first-level hypervisor, it is said to be running in the host. When a second-level hypervisor is running in a partition and is running a program in a virtual machine, the second-level hypervisor is referred to as guest1 and the program running in its virtual machine as guest2. Logically, each local processor has a smaller TLB1 and a larger TLB2. In one embodiment, millicode guarantees that at any given time the TLB1 and ALB contain entries for only a single zone (or guest1) and a single virtual machine (or guest2). It does this by purging the TLB1s and ALB on entry into the guest, if needed. The TLB2, on the other hand, may contain guest1 entries for multiple zones at a time—each being tagged with a zone number and an ID based on the guest1 state description address to differentiate them. The TLB2 may also contain guest2 entries for multiple virtual machines at a time—each being tagged with the guest1 zone number, G2 virtual machine ID (to be described below) and an ID based on the guest2 state description address.

In the state description, the level-1 hypervisor specifies a relocation zone number (RZone) associated with that partition or zone. All level-1 virtual CPUs within a given zone will have the same non-zero RZone value specified. Therefore, the RZone associated with the guest code that is currently running on any particular physical processor can be used to identify the processors that may be using resources associated with that zone. During entry into any guest1, millicode takes the RZone value from the control block and loads it into a hardware register call the Active Zone Number (AZN). The hardware uses the AZN in a number of ways. It is used for tagging entries made in the TLB2 and, therefore, to ensure correct tagging of the TLB2 entries, the AZN must be zero when running in host mode. As already described, in prior art, the hardware also uses the AZN to determine which quiesce purge requests should be filtered by the processor.

In the guest2 environment, since hypervisor2 virtualizes guest2 storage rather than just placing it at an offset, there is no RZone specified in the state description. However, in addition to the RZone in the state description, the hypervisor also specifies the origin of an area called the System Control Area (SCA). This area is used to control communication between multiple logical or virtual processors within a multi-processor (MP) partition or virtual machine, and therefore, the SCA origin (SCAO) for all virtual CPUs within a given zone or virtual machine is the same. In the state description for a uni-processor (UP) zone or virtual machine, this value is zero. This SCAO could also be used as a means to identify physical processors running on behalf of a particular zone but, in one embodiment, is not used at the guest1 level since the RZone is smaller field and is unique for both MP and UP zones. At the guest2 level, however, since there is no RZone, within a zone the SCAO can be used to uniquely identify all physical processors running on behalf of a given virtual machine.

The interruption of processors to honor the quiesce request is needed to prevent inconsistent values for translation tables or storage keys from being observed in the middle of an instruction or function. Originally, the quiesce interruption was honored by all processors in the system. In actuality, when the active zone on the receiving processor is different from the zone that initiated the quiesce operation, the storage accesses being made by the receiving processor do not use the system resources that are being updated by the initiating zone. As a result, there is no need for processors running in a zone different than the quiesce-initiator's zone to be interrupted. We refer to this a "zone filtering" and it is accomplished by tagging each quiesce request with a zone number equal to the active zone of the initiator.

Since the TLB1 contains entries for the current zone only, it does not hold any entries relevant to an IPTE, IDTE, CSP or CSPG request from a different zone and, therefore, it does not need to process the invalidation and associated quiesce interruption at all. In the case of an SSKE initiated by a different zone, there may be host entries in the local TLB1 which contain the old key value. The invalidation of these entries, however, can be delayed, as long as it is done before executing any host instructions. Even when running in a different zone than the quiesce initiator, the TLB2 may have entries relevant to the quiesce request, although they are not currently being used. The TLB2 must invalidate the appropriate entries, although when the requesting zone is different from the initiator it may be done in the background, using the provided zone number and other relevant information. This decreases the number of processors that need to be interrupted for a particular quiesce request and, in turn, also decreases the overall time needed to handle the quiesce request since you need to wait for fewer processors to respond to the interruption request.

Figure 4:
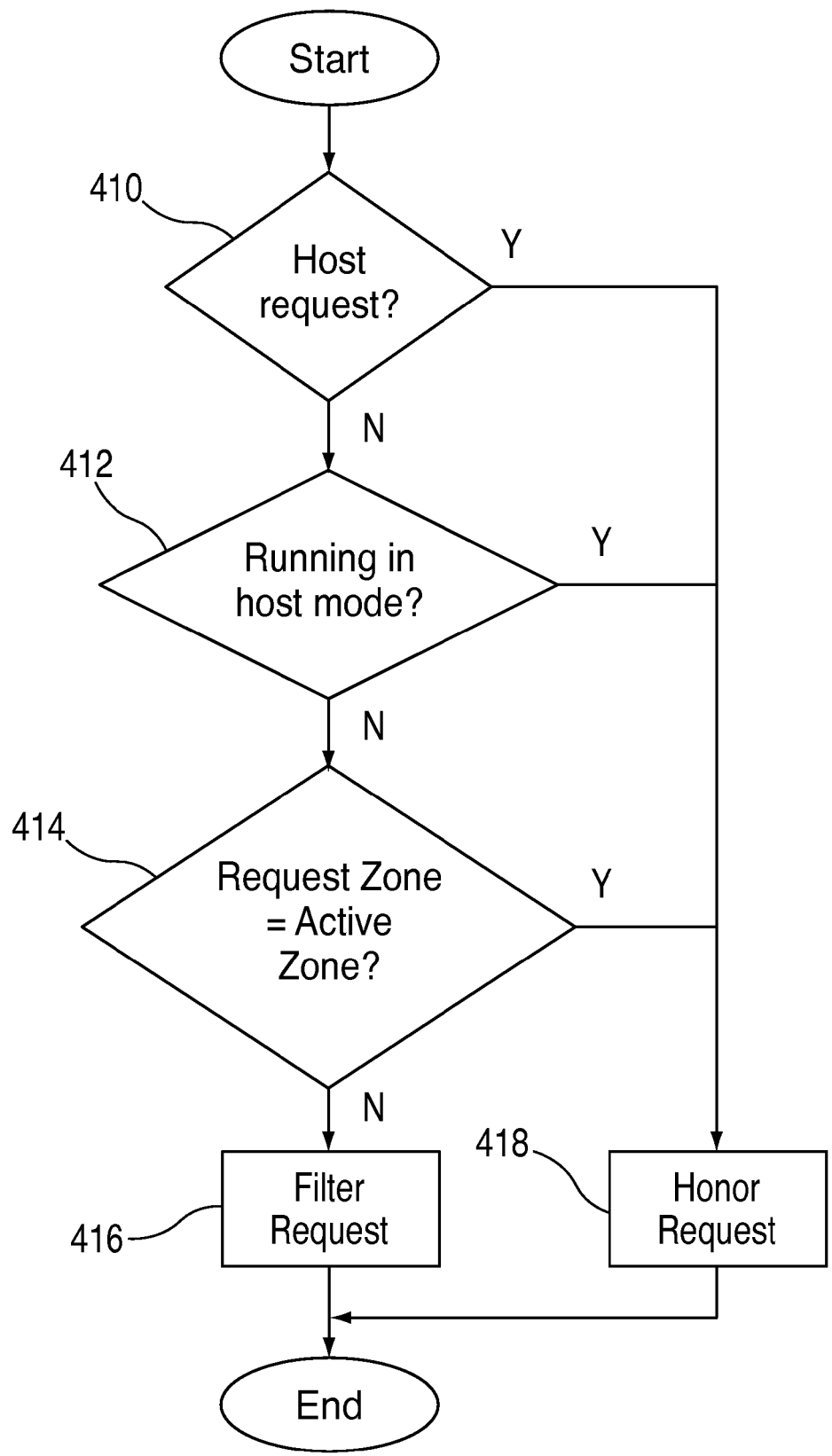
FIG. 4 depicts one embodiment of an algorithm to filter incoming quiesce interruption requests, in accordance with an aspect of the present invention.

FIG. 4 illustrates the algorithm used by the translator to determine if any particular quiesce request can filtered. If 1) the incoming quiesce request is a host request 410, 2) the receiving processor is currently running in host mode 412 or 3) the active zone of the receiving processor matches the active zone of the quiesce initiator 414 then the translator must honor (i.e. can not filter) the quiesce interruption request 418. Otherwise, the processor may filter the request 416.

Figure 5:
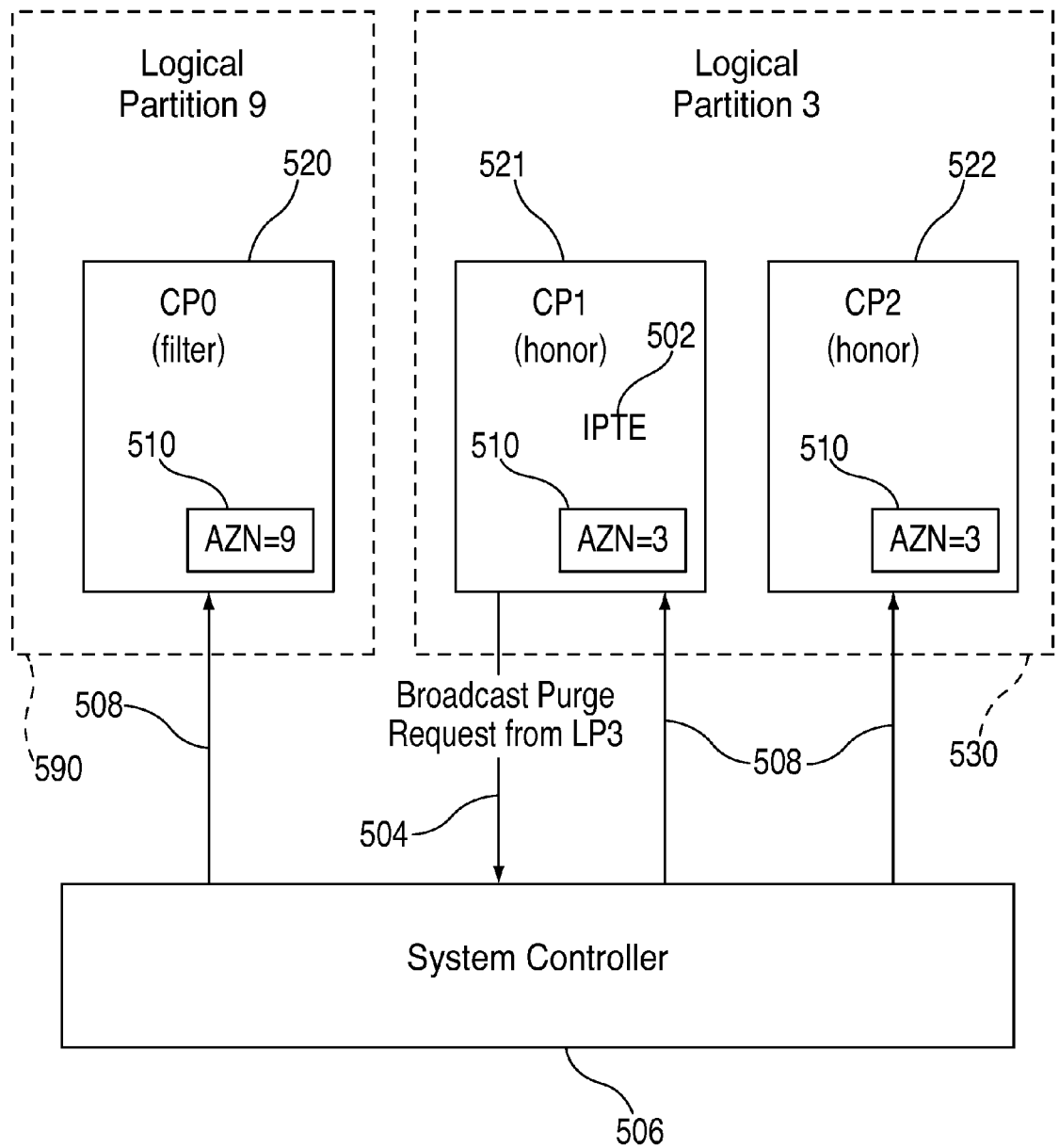
FIG. 5 depicts one embodiment of the flow associated with controlling a system resource update across a computing environment, in accordance with an aspect of the present invention.

In the example illustrated in FIG. 5, there are two logical partitions currently running in the computer environment—Logical Partition 9 (LP9) 590 and Logical Partition 3 (LP3) 530. On each physical processor, there is a register which holds the Active Zone Number (AZN) 510 that corresponds to the partition that is currently running on that processor. CP1, currently running LP3, executes a quiesce operation (IPTE in this case) 502. That IPTE millicode sends a quiesce request 504, tagged with LP3, to the system controller (SC) 506. The SC then forwards this request, still tagged with LP3, to all the processors in the system 508. In this case, CP0 520 is running a different partition (LP9 590) so the request can be filtered; CP1 521, the quiesce initiator, and CP2 522 are both running in LP3 530 as indicated by the AZN and, therefore, must honor the quiesce interruption request.

Figure 6:
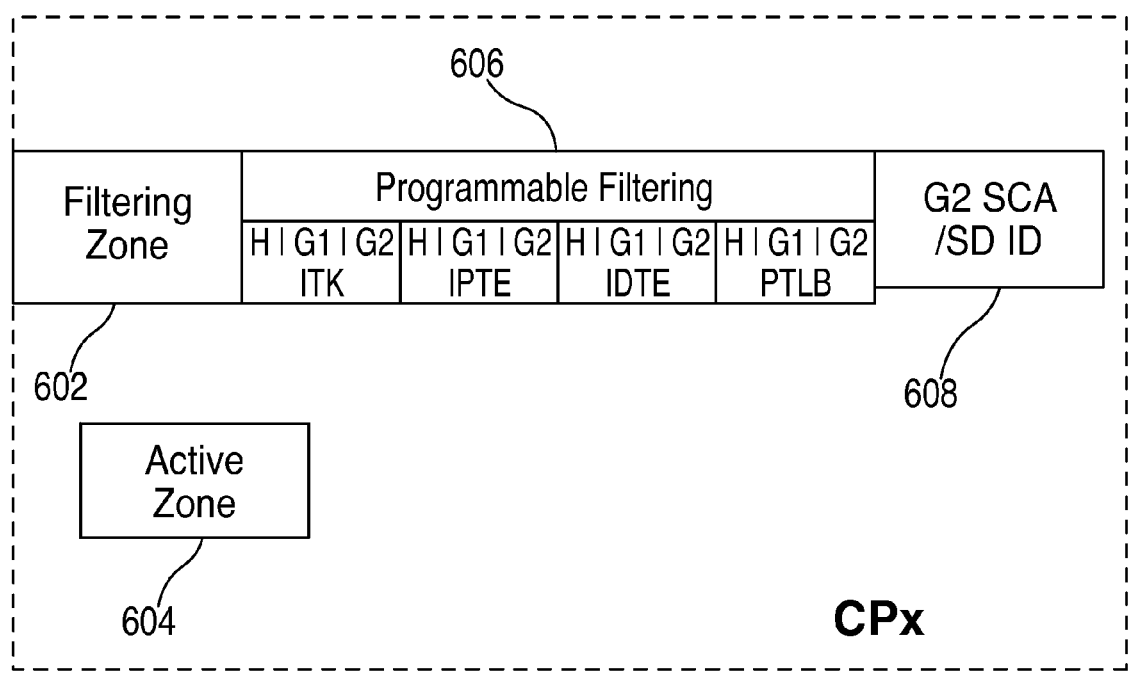
FIG. 6 depicts a filtering register, programmable by millicode that may be implemented by an exemplary embodiment of the present invention.

FIG. 6 depicts a filtering register, programmable by millicode that may be implemented by an exemplary embodiment of the present invention. This register allows the filtering zone (or FZone) 602 to be specified separately from the active zone 604. This provides more flexibility in zone filtering and, in particular, allows zone filtering to continue when the active zone number must be set to zero because the processor is running in the host or in i390 mode. In addition, there is a programmable register 606 which allows millicode to determine how each quiesce request should be filtered.

This invention adds an additional register 608, also depicted in FIG. 6, pertaining to the guest2 level. This register is used to provide filtering between guests running in virtual machines within a logical partition. In a guest MP environment the System Control Area (SCA) is used to control communication between multiple processors in the same guest2 virtual machine. The SCA Origin can be used to identify each guest2 virtual machine. The guest2 filtering value is equal to a hash of the SCA Origin for a multiprocessor virtual machine or equal to a hash of the state description address for a uniprocessor virtual machine. This value can be used to filter guest2 requests between virtual machines.

Figure 7A:
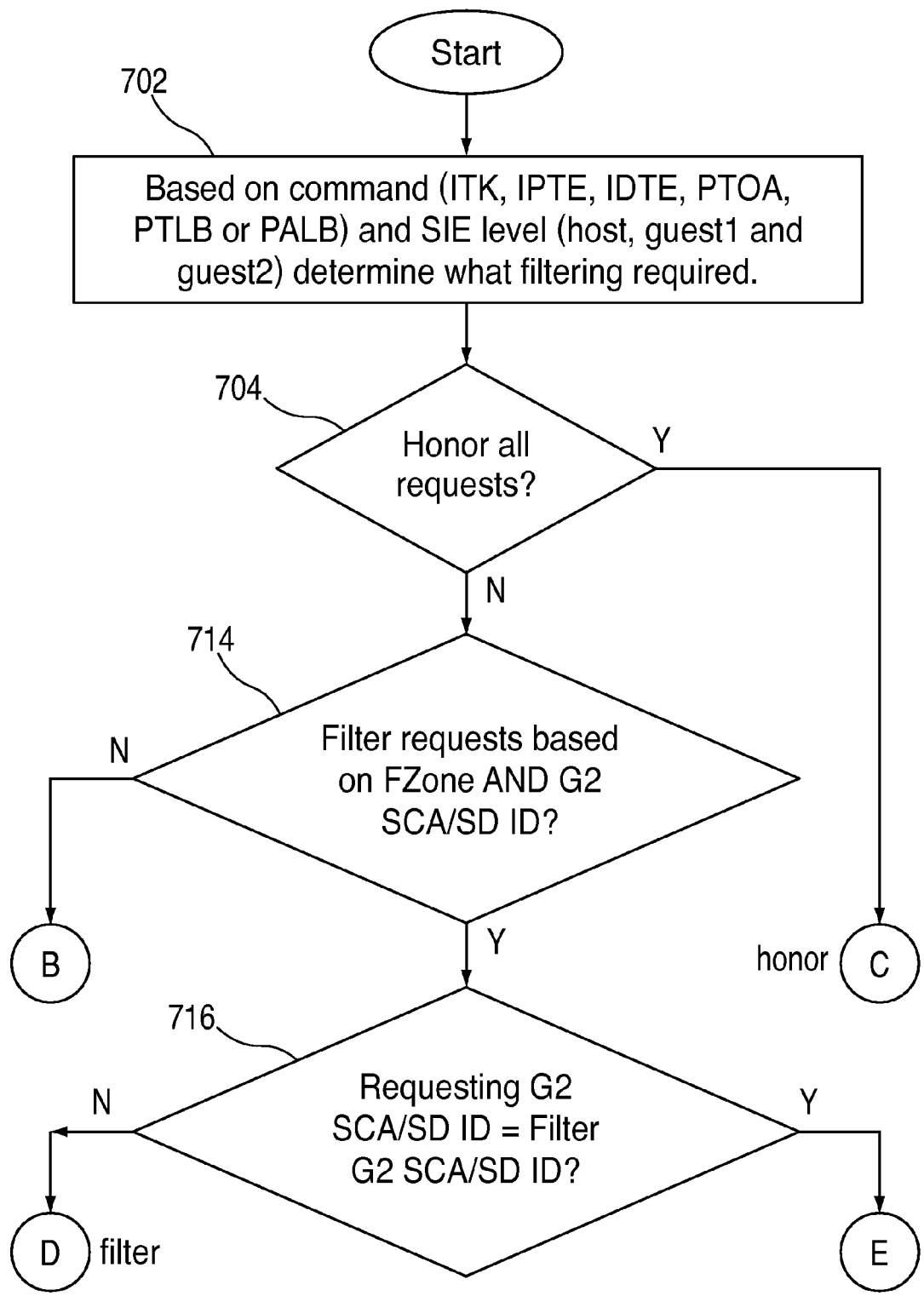
FIGS. 7A-7B depicts logic that may be utilized by an exemplary embodiment to determine which requests can be filtered by a local processor.
Figure 7B:
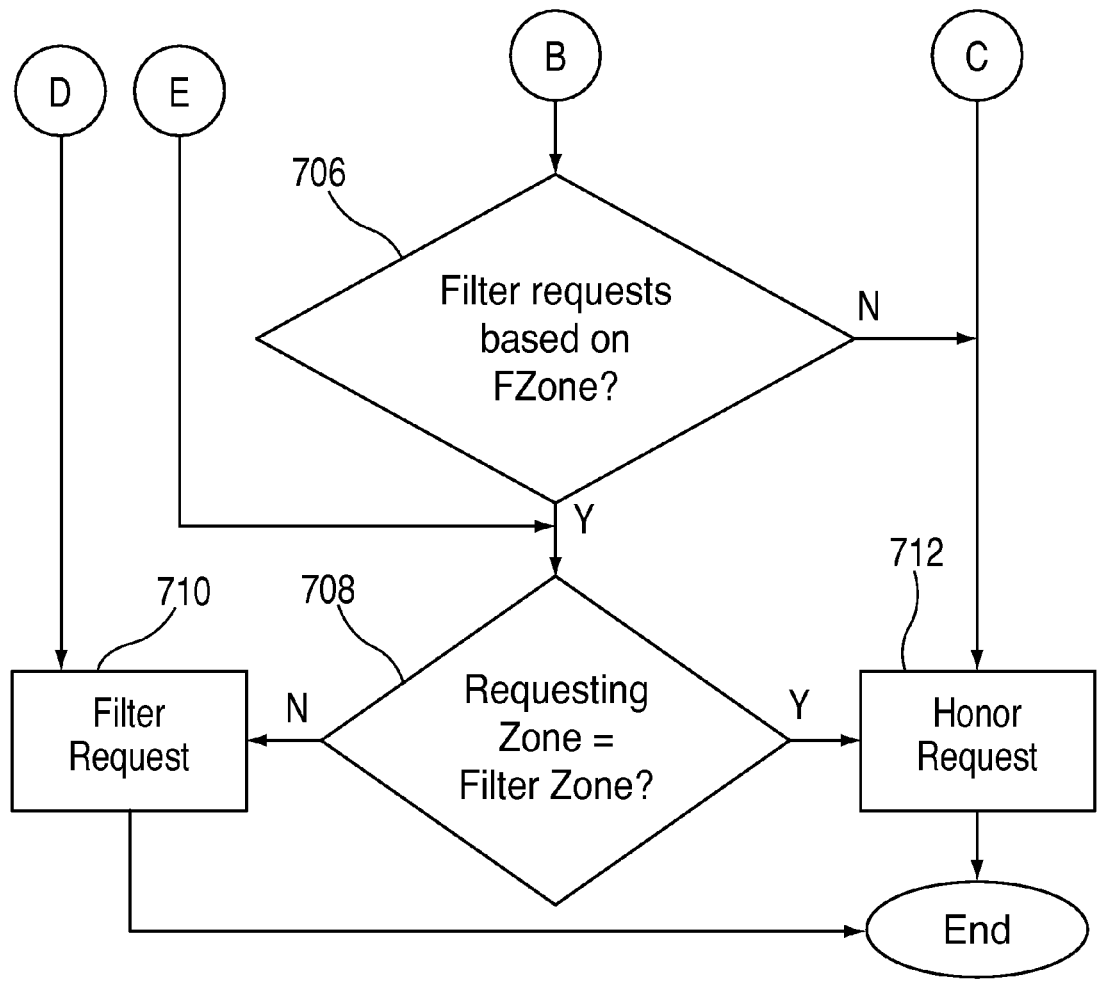

FIG. 7A-7B depicts one embodiment of the logic which utilizes the programmable register to determine which requests can be filtered by the local processor, including guest2 requests. As shown in FIG. 7A, when a broadcast purge request is received by the local processor, the translator uses the type of request and SIE level of request to determine which portion of the programmable register applies to this request 702. In this example, the request type can be an Invalidate TLB Key (ITK), which is issued by the SSKE instruction; Invalidate Page Table Entry (IPTE); Invalidate DAT Table Entry (IDTE), Purge TLB on ASCE (PTOA), which is issued by IDTE is specific circumstances; or Purge TLB and/or ALB (PTLB or PALB), which is issued by CSP and CSPG. The SIE level indicates whether the request applies to lookaside buffer entries derived from translations at the host, guest 1, or guest 2 level. If the setting of the appropriate field within the programmable register indicates that all requests should be honored 704, then the request is honored as in FIG. 7B 712. Otherwise, if the field indicates that a guest2 (G2) SCA/SD ID match is required FIG. 7A 714, then the G2 SCA/SD ID of the incoming request is compared with the Filtering G2 SCA/SD ID for the local processor 716 and if a match is made, then the flow continues at E (708) in FIG. 7B with a comparison between the requesting zone and the filtering zone as described below. If the G2 SCA/SD IDs do not match 716 then the request can be filtered as in FIG. 7B 710.

Otherwise, if no G2 SCA/SD ID match test is required 714, then the flow continues at B in FIG. 7B. If the programming field indicates that a zone match is required 706, then the zone of the incoming request is compared with the Filtering Zone (FZone) for the local processor 708 and if a match is made, the request is also honored 712. Otherwise, if either no zone match test is required 706 or if the zones do not match 708, then the request is filtered 710. When filtering is applied, the translator does not need to interrupt the local processor and can immediately respond to the quiesce request.

Figure 8:
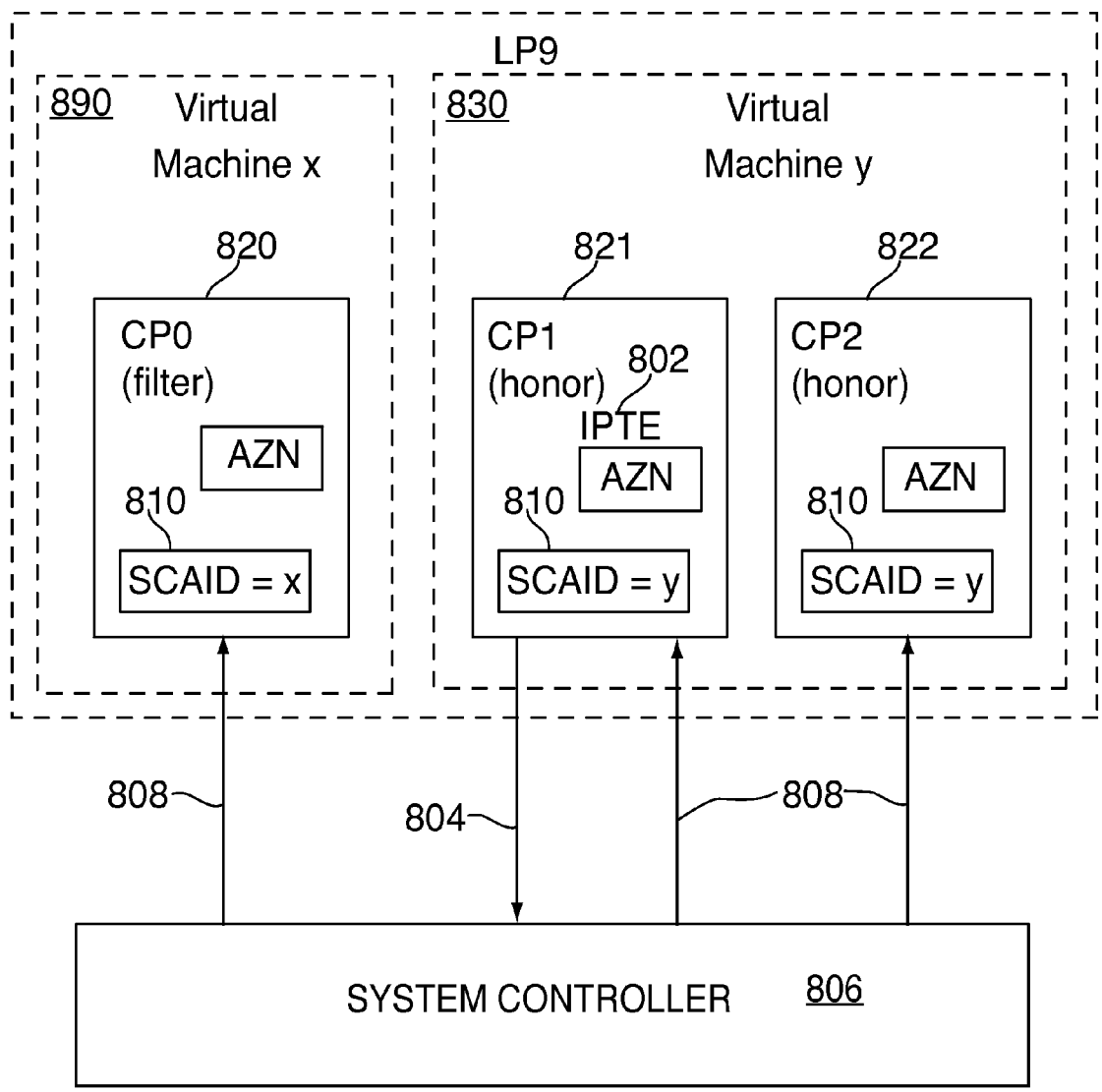
FIG. 8 depicts one embodiment of the flow associated with controlling a system resource update across a computing environment running a second-level hypervisor.

In the example illustrated in FIG. 8, there are two virtual machines currently running in a logical partition within the computer environment—Virtual Machine x (VMx) 890 and Virtual Machine (VMy) 830 running in logical partition 9 (LP9). On each physical processor, there is a register which holds the guest2 SCA/SD ID (SCAID) 810 that corresponds to the virtual machine that is currently running on that processor and a register which holds the active zone number (AZN) that corresponds to the partition that is currently running on that processor. CP1, currently running with SCAIDy and AZN9, executes a quiesce operation (IPTE in this case) 802. That IPTE millicode sends a quiesce request 804, tagged with SCAIDy and AZN9, to the system controller (SC) 806. The SC then forwards this request, still tagged with SCAIDy and AZN9, to all the processors in the system 808. In this case, CP0 820 is running the same partition (LP9) but in a different virtual machine (SCAIDx 890) so the request can be filtered; CP1 821, the quiesce initiator, and CP2 822 are both running in AZN9 and SCAIDy 530 and, therefore, must honor the quiesce interruption request. Any processor which is running in a different logical partition will also filter the request.

Technical effects and benefits include the ability to provide filtering between G2 virtual machines running in a logical partition. This may lead to a reduce system overhead for quiesce operations because fewer quiesce operations will have to be performed.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. The capabilities of the present invention can be implemented in software, firmware, hardware or some combination thereof. For example, embodiments of the invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for filtering level two guest (G2) quiesce interruption requests, the method comprising:

determining, based on any one of a state description address or a system control area origin, a current G2 virtual machine (VM) identifier, wherein responsive to a G2 being a uni-processor, the current G2 VM identifier is obtained from the state description address, and responsive to the G2 being a multi-processor, the current G2 VM identifier is obtained from the system control area origin;

receiving a G2 quiesce interruption request at a processor currently or previously executing the G2 running under a level two hypervisor in a logical partition, the logical partition managed by a level one hypervisor, the G2 including a current zone and the current G2 VM identifier, and the G2 quiesce interruption request specifying an initiating zone and an initiating G2 VM identifier;

determining if the G2 quiesce interruption request can be filtered by the processor, the determining responsive to the current G2 VM identifier, the current zone, the initiating zone and the initiating G2 VM identifier; and filtering the G2 quiesce interruption request at the processor in response to determining that the G2 quiesce interruption request can be filtered, thereby providing filtering between G2 virtual machines running in the logical partition.

2. The method of claim 1 further comprising responding to the G2 quiesce interruption request at the processor in response to determining that the G2 quiesce interruption request cannot be filtered.

3. The method of claim 1 wherein the current G2 VM identifier is located in a programmable filtering register associated with the processor.

4. The method of claim 3 wherein contents of the programmable filtering register are updatable by code executing on the processor.

5. The method of claim 1 wherein the G2 quiesce interruption request is associated with a type and Start Interpretive Execution (SIE) level and the determining is further responsive to the type and SIE level.

6. A system for filtering level two guest (G2) quiesce interruption requests, the system comprising:

a processor configured to perform a method comprising:

determining, based on any one of a state description address or a system control area origin, a current G2 virtual machine (VM) identifier, wherein responsive to a G2 being a uni-processor, the current G2 VM identifier is obtained from the state description address, and responsive to the G2 being a multi-processor, the current G2 VM identifier is obtained from the system control area origin;

receiving a G2 quiesce interruption request at the processor, the processor currently or previously executing the G2 running under a level two hypervisor in a logical partition, the logical partition managed by a level one hypervisor, the G2 including a current zone and the current G2 virtual machine (VM) identifier, and the G2 quiesce interruption request specifying an initiating zone and an initiating G2 VM identifier;

determining if the G2 quiesce interruption request can be filtered by the processor, the determining responsive to the current G2 VM identifier, the current zone, the initiating zone and the initiating G2 VM identifier; and filtering the G2 quiesce interruption request at the processor in response to determining that the G2 quiesce interruption request can be filtered, thereby providing filtering between G2 virtual machines running in the logical partition.

7. The system of claim 6 wherein the method further comprises responding to the G2 quiesce interruption request at the processor in response to determining that the G2 quiesce interruption request cannot be filtered.

8. The system of claim 6 wherein the processor further comprises a programmable filtering register associated with the processor and the current G2 VM identifier is located in the programmable filtering register.

9. The system of claim 8 wherein contents of the programmable filtering register are updatable by code executing on the processor.

10. The system of claim 6 wherein the G2 quiesce interruption request is associated with a type and SIE level and the determining is further responsive to the type and SIE level.

11. A computer program product for filtering level two guest (G2) quiesce interruption requests, the computer program product comprising:

a non-transitory storage medium readable by a processing circuit and storing instructions for execution by the processing circuit for performing a method comprising:

determining, based on any one of a state description address or a system control area origin, a current G2 virtual machine (VM) identifier, wherein responsive to a G2 being a uni-processor, the current G2 VM identifier is obtained from the state description address, and responsive to the G2 being a multi-processor, the current G2 VM identifier is obtained from the system control area origin;

receiving a G2 quiesce interruption request at a processor currently or previously executing the G2 running under a level two hypervisor in a logical partition, the logical partition managed by a level one hypervisor, the G2 including a current zone and the current G2 VM identifier, and the G2 quiesce interruption request specifying an initiating zone and an initiating G2 VM identifier;

determining if the G2 quiesce interruption request can be filtered by the processor, the determining responsive to the current G2 VM identifier, the current zone, the initiating zone and the initiating G2 VM identifier; and filtering the G2 quiesce interruption request at the processor in response to determining that the G2 quiesce interruption request can be filtered, thereby providing filtering between G2 virtual machines running in the logical partition.

12. The computer program product of claim 11 wherein the method further comprises responding to the G2 quiesce interruption request at the processor in response to determining that the G2 quiesce interruption request cannot be filtered.

13. The computer program product of claim 11 wherein the current G2 VM identifier is located in a programmable filtering register associated with the processor.

14. The computer program product of claim 11 wherein the G2 quiesce interruption request is associated with a type and SIE level and the determining is further responsive to the type and SIE level.

* * * * *